United States Patent [19]
Kamiya

[11] Patent Number: 4,817,181
[45] Date of Patent: Mar. 28, 1989

[54] IMAGE DATA PROCESSING SYSTEM FOR IMAGE INPUT DEVICE

[75] Inventor: Kenji Kamiya, Tajimi, Japan

[73] Assignee: Ricoh Company, Ltd., Tokyo, Japan

[21] Appl. No.: 170,081

[22] Filed: Mar. 11, 1988

Related U.S. Application Data

[63] Continuation of Ser. No. 847,452, Apr. 3, 1986, abandoned.

[30] Foreign Application Priority Data

Apr. 12, 1985 [JP] Japan ................... 60-76793

[51] Int. Cl.$^4$ ............................................. G06K 9/40
[52] U.S. Cl. ...................................... 382/54; 358/280; 358/284
[58] Field of Search ........................ 358/213.11, 213.26, 358/213.28, 282–284, 287, 288; 382/41–45, 47, 50–52, 54, 56

[56] References Cited

U.S. PATENT DOCUMENTS

| | | | |
|---|---|---|---|
| 4,517,607 | 5/1985 | Ohkouchi et al. | 358/280 |
| 4,553,173 | 11/1985 | Kawamura | 358/283 |
| 4,554,593 | 11/1985 | Fox et al. | 382/54 |
| 4,589,034 | 5/1986 | Yokomizo | 382/54 |
| 4,593,297 | 6/1986 | Suzuki et al. | 358/283 |
| 4,748,677 | 5/1988 | Yokomizo | 382/50 |

FOREIGN PATENT DOCUMENTS 0093429 9/1983 European Pat. Off.

Primary Examiner—Leo H. Boudreau
Assistant Examiner—Jose L. Couso
Attorney, Agent, or Firm—Oblon, Fisher, Spivak, McClelland & Maier

[57] ABSTRACT

An image data processing system for use with an image input device of a facsimile apparatus, digital copier, computer or the like. By using the fact that both MTF compensation processing said scanning line density conversion processing are represented by a sum of products of peripheral pixels and coefficients, i.e., linear product of peripheral pixels, the system adequately selects values of the coefficients to simultaneously effect MTF compensation processing and scanning line density conversion processing by way of the same architecture.

6 Claims, 2 Drawing Sheets

IMAGE DATA PROCESSING SYSTEM FOR IMAGE INPUT DEVICE

This application is a continuation of application Ser. No. 847,452, filed on Apr. 3, 1986, now abandoned.

BACKGROUND OF THE INVENTION

The present invention relates to an image data processing system which is suitable for use with an image input device of, among others, a facsimile apparatus, a digital copier, a calculator or the like.

Generally, an image input device of the kind described performs two different kinds of image data processing, i.e., MTF (modulation transfer function) compensation processing adapted to enhance resolution and scanning line density conversion processing adapted to produce image data with an optimum scanning line density which is associated with the instantaneous image quality. These kinds of image data processing have traditionally been implemented with two independent modules, wasting much of the construction due to many overlapping sections in architecture.

SUMMARY OF THE INVENTION

It is therefore an object of the present invention to provide an image data processing system which achieves high efficiency by effecting MTF compensation processing and scanning line density conversion processing at the same time.

It is another object of the present invention to provide an image data processing system which performs MTF compensation processing and scanning line density conversion processing at the same time using the same architecture, thereby cutting down the dimensions and speeding up the operation at low cost.

It is another object of the present invention to provide a generally improved image data processing system for an image input device.

An image data processing system for applying MTF (modulation transfer function) compensation processing and scanning line density conversion processing to sampled image data which are produced by scanning of the present invention comprises a data input and hold device for inputting and holding peripheral pixel data which are adapted for conversion of scanning line density out of the sampled image data by interpolation, a weighting coefficient set and hold device for setting and holding weighting coefficients, which are associated one with each of the peripheral pixel data, in conformity to an MFT compensation coefficient and a scanning line conversion coefficient, and a compute device for producing a sum of products of the inputted and held respective peripheral pixel data and the set and held respective weighting coefficients, whereby the sampled image data are subjected to MTF compensation processing and the scanning line density processing at the same time.

In accordance with the present invention, an image data processing system for use with an image input device of a facsimile apparatus, digital copier, computer or the like is disclosed. Paying attention to the fact that both MTF compensation processing and scanning line density conversion processing are represented by a sum of products of peripheral pixels and coefficients, i.e., linear product of peripheral pixels, the system adequately selects values of the coefficients to simultaneously effect MTF compensation processing and scanning line density conversion processing by means of the same architecture.

The above and other objects, features and advantages of the present invention will become more apparent from the following detailed description taken with the accompanying drawings.

DESCRIPTION OF THE PREFERRED EMBODIMENT

While the imae data processing system of the present invention is susceptible of numerous physical embodiments, depending upon the environment and requirements of use, a substantial number of the herein shown and described embodiment have been made, tested and used, and all have performed in an eminently satisfactory manner.

A preferred embodiment of the present invention will be described with reference to the accompanying drawings.

Figure 1:
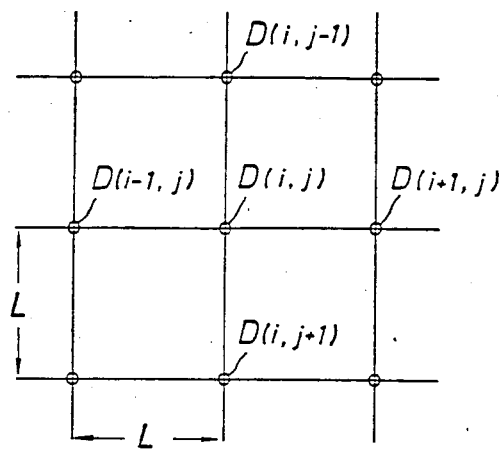
FIG. 1 shows a matrix of pixel data for describing MTF compensation processing.

As shown in FIG. 1, assume pixel data $D(i,j)$ which has been sampled at predetermined intervals L from the others in the two-dimensional direction. Where MTF compensation is applied to the pixel data $D(i,j)$ using four other pixel data which immediately neighbor the data $D(i,j)$, the compensated pixel data $\hat{D}(i,j)$ is generally expressed as $$\hat{D}(i,j) = \lambda D(i,j) + \mu[D(i,j-1) + D(i,j+1) + D(i-1,j) + D(i+1,j)] \quad \text{Eq. (1)}$$

where $$\lambda + 4\mu = 1 \quad \text{Eq. (2)}$$

$$\lambda \geq 1 \quad \text{Eq. (3)}$$

The Eq. (2) is the condition which guarantees that when all the pixel data have the same value, the compensated pixel data, too, has the same value as that of the others (hereinafter referred to as guarantee of uniformity). The Eq. (3) on the other hand is the condition which guarantees making variation prominent. Usually, there are used $\lambda = 3$ and $\mu = -\frac{1}{2}$.

Figure 2:
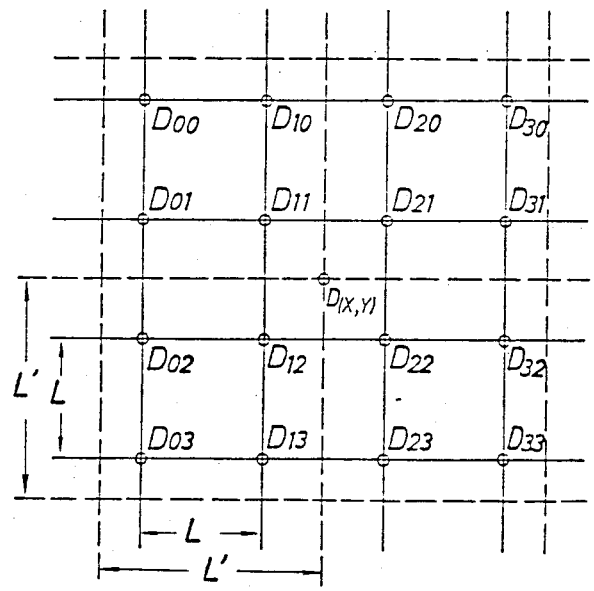
FIG. 2 shows an arrangement of pixel data for describing scanning line density conversion processing.

Meanwhile, as shown in FIG. 2, assume a pixel data $D(i,j)$ which is located at predetermined intervals L from others as represented by an intersection of solid lines. Where the scanning line density is converted such that the pixel data $D(i,j)$ is replaced by pixel data which is spaced predetermined intervals L as represented by an intersection of phantom lines, the resulting pixel data $D(X,Y)$ is expressed as $$D(X,Y) = \sum_{i=-\infty}^{\infty} \sum_{j=-\infty}^{\infty} D(i,j) \cdot S(X-i) \cdot S(Y-j) \quad \text{Eq. (4)}$$

where $S(X)$ is representative of a sampling function which is produced by $$S(X) = \frac{\operatorname{Sin}(WX/2)}{(WX/2)} \quad \left(\text{where } W = \frac{2\pi}{L}\right) \quad \text{Eq. (5)}$$

While scanning line density conversion is performed based on the above Eq. (5), the observed pixel data D(X,Y) is approximated by 4×4 neighboring pixels as illustrated, in order to realize the conversion on a real time basis. Assuming that the approximated value is $\bar{D}(X,Y)$, then $$\bar{D}(X,Y) = \delta \sum_{i=0}^{3}\sum_{j=0}^{3} D(i,j) \cdot S(X-i) \cdot S(Y-j) \quad \text{Eq. (6)}$$

Because the Eq. (6) must satisfy the condition for guarantee of uniformity, $$\delta \sum_{i=0}^{3}\sum_{j=0}^{3} S(X-i) \cdot S(Y-j) = 1 \quad \text{Eq. (7)}$$

Therefore $$\delta = \frac{1}{\sum_{i=0}^{3}\sum_{j=0}^{3} S(X-i) \cdot S(Y-j) = 1} \quad \text{Eq. (8)}$$

Assuming $$\frac{S(X-i) \cdot S(Y-j)}{\sum_{i=0}^{3}\sum_{j=0}^{3} S(X-i) \cdot S(Y-j)} = S'(X-i, Y-j) \quad \text{Eq. (9)}$$

Then, the Eq. (6) may be substituted by $$\bar{D}(X,Y) = \sum_{i=0}^{3}\sum_{j=0}^{3} D(i,j) \cdot S'(X-i, Y-j) \quad \text{Eq. (10)}$$

From the Eqs. (7) and (9), $$\sum_{i=0}^{3}\sum_{j=0}^{3} S'(X-i, Y-j) = 1 \quad \text{Eq. (11)}$$

As discussed above, MTF compensation processing is performed according to the Eq. (1) and scanning line density processing according to the Eq. (10). It will be seen that the Eqs. (1) and (10) are the linear sums of the peripheral or surrounding pixels and, in addition, share the same condition for guarantee of uniformity.

It follows that where the pixel data D(i,j) is subjected to MTF compensation to produce $\hat{D}(i,j)$ and then to scanning line density conversion, the resulting pixel data $\bar{\bar{D}}(X,Y)$ may be expressed as $$\bar{\bar{D}}(X,Y) = \sum_{i=-1}^{4}\sum_{j=-1}^{4} \hat{D}(i,j) S'(X-i, Y-j) \quad \text{Eq. (12)}$$

The reason why each of i and j assumes values of −1 to 4 is that during MTF compensation processing one pixel which is located further outwardly of the outermost pixel data, which will be needed for scanning line density conversion, is fetched at each side. Nevertheless, scanning line density conversion is less effected as the distance between the observed pixel and others increases; the coefficient K(i,j) of those extra peripheral pixels is sufficiently smaller than that of the others. As a result, images will be substantially free from deterioration even if the Eq. (12) is approximated by $$\bar{\bar{D}}(X,Y) \simeq \sum_{i=0}^{3}\sum_{j=0}^{3} K(i,j)D(i,j) \quad \text{Eq. (13)}$$

Based on the condition for guarantee of uniformity, there is obtained $$\sum_{i=0}^{3}\sum_{j=0}^{3} K(i,j) = 1 \quad \text{Eq. (14)}$$

As will be apparent from the Eqs. (13) and (14), MTF compensation can be effected simultaneously with density conversion only if the weighing coefficient K(i,j) of each pixel is adequately selected.

Figure 3:
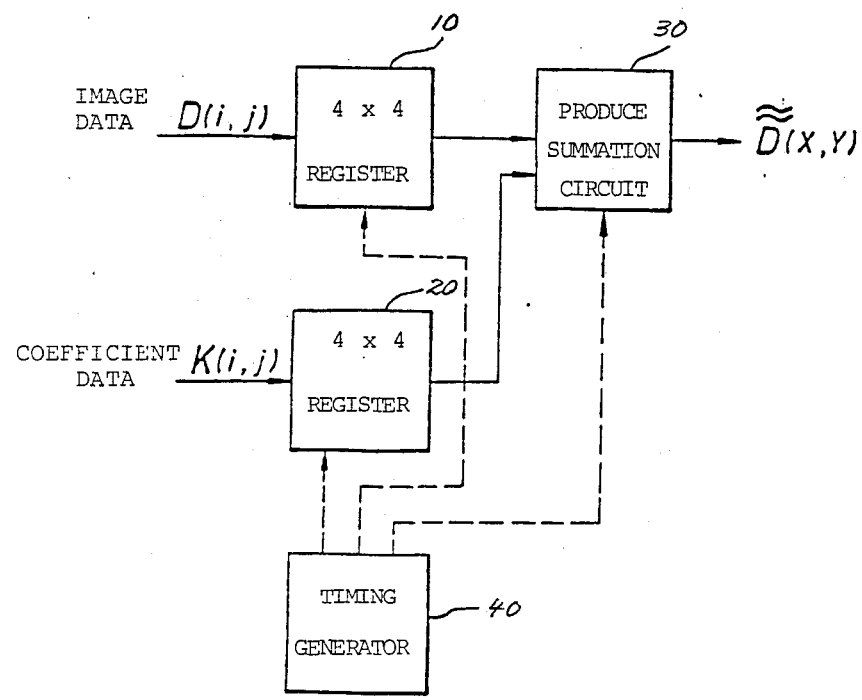
FIG. 3 is a block diagram of an image data processing device embodying the present invention.

Referring to FIG. 3, a specific construction for implementing the above concept is shown. The construction includes a register 10 for storing 4×4 pixel data, a register 20 for storing 4×4 coefficient data associated with the pixel data, a product summation circuit 30, and a timing generator 40. The register 20 has stored coefficients K(i,j) associated with respective pixels which satisfy the Eqs. (13) and (14) in conformity to a scanning line density. The pixel data D(i,j) and the coefficient data K(i,j) respectively are sequentially read out of the registers 10 and 20 one at a time responsive to a timing signal which is outputted by the timing generator 40, both of the data being applied to the product summation circuit 30. The circuit 30 produces products of the input data and sums the products and, every time it produces a sum of sixteen products, outputs density converted pixel data $\bar{\bar{D}}(X,Y)$. Every time one pixel data is fed out of the register 10, one new pixel data is fed to the register 10.

Repeating the above procedure, the apparatus is capable of providing pixel data which have undergone MTF compensation processing and scanning line density conversion processing at the same time.

It will be needless to mention that the register 10, the register 20 and the product summation circuit 30 may respectively be implemented with a random access memory (RAM), a read only memory (ROM), and a central processing unit (CPU), for example.

If desired, the MTF compensation processing and the scanning line density conversion processing described hereinabove may be applied to the main scanning (one dimension) direction only, and be effected in the sub-scanning direction by changing the amount of feed. In this case, the processed data $\bar{\bar{D}}(X)$ may be produced by $$\bar{\bar{D}}(X) = \sum_{i=0}^{3} \hat{D}(i)S'(X-i) \quad \text{Eq. (15)}$$

$$S'(X-i) = \frac{S(X-i)}{\sum_{i=0}^{3} S(X-i)} \quad \text{Eq. (16)}$$

Assuming that the MTF compensation coefficient λ is "3" and μ is ½, the Eq. (15) may be expressed as $$\bar{\bar{D}}(X) = \sum_{i=0}^{3} [3D(i) - \tfrac{1}{2}(D(i-1) + D(i+1))] \quad \text{Eq. (17)}$$

In summary, it will be seen that in accordance with the present invention MTF compensation processing and scanning line density conversion processing are attainable at the same time by means of the same architecture to enhance a small-size and high-speed apparatus design at low cost.

Various modifications will become possible for those skilled in the art after receiving the teachings of the present disclosure without departing from the scope thereof.

What is claimed is:

1. An image data processing system for applying MTF (modulation transfer function) compensation processing and scanning line density conversion processing to sampled image data which are produced by scanning, comprising:
    data input and hold means for inputting and holding peripheral pixel data;
    means for conversion of said held peripheral pixel data to scanning line density from the sample image data by interpolation;
    weighting coefficient set and hold means for setting and holding weighting coefficients, which are associated one with each of the peripheral pixel data, in conformity to an MTF compensation coefficient and a scanning line conversion coefficient; and
    computing means for producing a sum of products of the inputted and held respective peripheral pixel data and the set and held respective weighting coefficients;
    whereby the sampled image data are subjected to MTF compensation processing and the scanning line density processing at the same time by the said computing means and using at least some of the same weighting coefficients.

2. A system as claimed in claim 1, wherein said data input and hold means comprises a pixel data register which stores two-dimensional 4×4 pixel data.

3. A system as defined in claim 2, wherein said weighting coefficient set and hold means comprises a coefficient data register which stores 4×4 coefficient data associated with the 4×4 pixel data.

4. A system as claimed in claim 3, wherein said compute means comprises a central processing unit.

5. A system as defined in claim 4, wherein said pixel data register comprises a random access memory and said coefficient data register, a read only memory.

6. A system as claimed in claim 3, further comprising timing signal generator means for generating a timing signal which is applied to said pixel data register to sequentially read out the pixel data stored in said pixel data register one at a time and to said coefficient data register to sequentially read out the coefficient data one at a time.

* * * * *